(12) United States Patent
Ike

(10) Patent No.: US 11,311,163 B2
(45) Date of Patent: Apr. 26, 2022

(54) SELF-PROPELLING CLEANING ROBOT

(71) Applicant: NIHON BUSINESS DATA PROCESSING CENTER CO., LTD., Hyogo (JP)

(72) Inventor: Tomotaro Ike, Hyogo (JP)

(73) Assignee: NIHON BUSINESS DATA PROCESSING CENTER CO., LTD., Kobe (JP)

( * ) Notice: Subject to any disclaimer, the term of this patent is extended or adjusted under 35 U.S.C. 154(b) by 0 days.

(21) Appl. No.: 17/032,960

(22) Filed: Sep. 25, 2020

(65) Prior Publication Data

US 2021/0007571 A1 Jan. 14, 2021

Related U.S. Application Data

(63) Continuation of application No. PCT/JP2018/041255, filed on Nov. 6, 2018.

(51) Int. Cl.
*A47L 9/28* (2006.01)
*A47L 9/00* (2006.01)

(52) U.S. Cl.
CPC ............ *A47L 9/2852* (2013.01); *A47L 9/009* (2013.01); *A47L 9/2842* (2013.01); *A47L 9/2857* (2013.01); *A47L 2201/04* (2013.01)

(58) Field of Classification Search
None
See application file for complete search history.

(56) References Cited

U.S. PATENT DOCUMENTS

| | | | | |
|---|---|---|---|---|
| 6,718,533 | B1 * | 4/2004 | Schneider | G06F 8/10 717/100 |
| 8,374,721 | B2 * | 2/2013 | Halloran | A47L 9/2894 342/450 |
| 8,552,983 | B2 * | 10/2013 | Chiu | G06F 3/017 704/275 |
| 9,358,685 | B2 * | 6/2016 | Meier | B25J 9/163 |
| 9,486,924 | B2 * | 11/2016 | Dubrovsky | G05B 19/409 |
| 9,599,990 | B2 * | 3/2017 | Halloran | G05D 1/0227 |
| 9,717,387 | B1 * | 8/2017 | Szatmary | A47L 9/2847 |
| 9,811,089 | B2 | 11/2017 | Lindhe et al. | 701/28 |

(Continued)

FOREIGN PATENT DOCUMENTS

| | | |
|---|---|---|
| CN | 204120959 U | 1/2015 |
| EP | 2 381 328 A2 | 4/2011 |

(Continued)

OTHER PUBLICATIONS

International Search Report issued in PCT/JP2018/41255 dated Jan. 8, 2019 with English Translation (5 pages).

(Continued)

*Primary Examiner* — Bhavesh V Amin
(74) *Attorney, Agent, or Firm* — Stein IP, LLC

(57) ABSTRACT

A self-propelling cleaning robot includes a main body, a driving part configured to propel the main body, a cleaning part configured to clean a cleaning area, a sensor part configured to detect an obstacle, and a control unit mounted on the main body and configured to control the driving part and the sensor part. The control unit includes a controller having an integrated development environment to create a programming code, and the controller is connectable with an external device.

4 Claims, 6 Drawing Sheets

(56) References Cited

U.S. PATENT DOCUMENTS

| | | | |
|---|---|---|---|
| 10,045,676 B2* | 8/2018 | Dubrovsky | B25J 13/006 |
| 10,209,080 B2 | 3/2019 | Lindhe et al. | |
| 10,376,117 B2* | 8/2019 | Szatmary | A47L 9/2847 |
| 10,542,859 B2* | 1/2020 | Lee | G05D 1/0248 |
| 2003/0179916 A1* | 9/2003 | Magnuson | G01N 15/1463 |
| | | | 382/128 |
| 2004/0142603 A1* | 7/2004 | Walker | H01L 25/16 |
| | | | 439/701 |
| 2005/0111328 A1* | 5/2005 | Potyrailo | G01N 35/00069 |
| | | | 369/53.25 |
| 2005/0118060 A1* | 6/2005 | Evans | G01N 35/028 |
| | | | 422/63 |
| 2005/0287038 A1* | 12/2005 | Dubrovsky | B25J 13/006 |
| | | | 422/63 |
| 2006/0188409 A1* | 8/2006 | Chang | B01L 9/523 |
| | | | 422/400 |
| 2007/0208442 A1* | 9/2007 | Perrone | G05D 1/0088 |
| | | | 700/95 |
| 2012/0168240 A1* | 7/2012 | Wilson | G05D 1/027 |
| | | | 701/2 |
| 2012/0259481 A1* | 10/2012 | Kim | G05D 1/0044 |
| | | | 701/25 |
| 2013/0060379 A1 | 3/2013 | Choe et al. | 700/245 |
| 2014/0207282 A1* | 7/2014 | Angle | G06Q 10/1095 |
| | | | 901/1 |
| 2014/0316636 A1* | 10/2014 | Hong | G05D 1/0274 |
| | | | 901/1 |
| 2015/0127150 A1* | 5/2015 | Ponulak | G05D 1/0088 |
| | | | 700/250 |
| 2015/0272413 A1 | 10/2015 | Miyake et al. | |
| 2016/0023357 A1* | 1/2016 | Dubrovsky | G05D 1/0016 |
| | | | 700/264 |
| 2016/0221186 A1* | 8/2016 | Perrone | B25J 9/1661 |
| 2016/0309973 A1* | 10/2016 | Sheikh | A47L 11/4066 |
| 2017/0224183 A1* | 8/2017 | Dubrovsky | B25J 13/00 |
| 2017/0265703 A1 | 9/2017 | Park et al. | |
| 2017/0273527 A1* | 9/2017 | Han | B25J 13/006 |
| 2017/0329347 A1* | 11/2017 | Passot | G05D 1/0274 |
| 2018/0020893 A1* | 1/2018 | Lee | A47L 9/2805 |
| | | | 701/28 |
| 2018/0092304 A1* | 4/2018 | Moore | G05D 1/0231 |
| 2018/0120116 A1* | 5/2018 | Rombouts | G01S 17/89 |
| 2018/0125319 A1* | 5/2018 | Szatmary | G05D 1/0221 |
| 2018/0136979 A1* | 5/2018 | Morris | G06F 9/5027 |
| 2019/0254490 A1* | 8/2019 | Marutani | A47L 9/2847 |
| 2019/0380551 A1* | 12/2019 | Szatmary | A47L 9/2852 |

FOREIGN PATENT DOCUMENTS

| | | |
|---|---|---|
| JP | S62-251807 A | 11/1987 |
| JP | H9-313743 A | 12/1997 |
| JP | H10-21062 A | 1/1998 |
| JP | 10-202563 A | 8/1998 |
| JP | 2004-166968 A | 6/2004 |
| JP | 2007-226322 A | 9/2007 |
| JP | 2011-224732 A | 11/2011 |
| JP | WO 2014/103293 A1 | 7/2014 |
| JP | 2018-075191 A | 5/2018 |
| JP | 2018-513768 A | 5/2018 |
| KR | 10-2002-0049784 A | 6/2002 |
| KR | 10-2016-0100149 A1 | 8/2016 |

OTHER PUBLICATIONS

Notification of Reasons for Refusal issued in Japanese Patent Application No. 2019-519436 dated May 15, 2019 with English Translation (10 pages).

Notification of Reasons for Refusal issued in Japanese Patent Application No. 2019-519436 dated Oct. 16, 2019 with English Translation (6 pages).

Chinese Office Action dated Nov. 9, 2020, issued by the China National Intellectual Property Administration in corresponding application CN 201880063479.X.

Korean Office Action dated Nov. 19, 2021, issued by the Korean Intellectual Property Office in corresponding application KR 10-2021-7017285.

Indian Office Action dated Dec. 22, 2021 in corresponding application IN 202027050096, issued by the Intellectual Property of India.

* cited by examiner

SELF-PROPELLING CLEANING ROBOT

CROSS-REFERENCE TO RELATED APPLICATIONS

This application is a continuation application of International Patent Application No. PCT/JP2018/041255 filed on Nov. 6, 2018, the entire content of which is incorporated by reference.

TECHNICAL FIELD

The present disclosure relates to a self-propelling cleaning robot in which programming to achieve traveling according to a demand of a user can be performed.

BACKGROUND ART

In recent years, a self-propelling cleaning robot which cleans a floor by traveling autonomously is becoming popular. The self-propelling cleaning robot can detect an obstacle, such as a wall, a pillar and furniture, and travel while avoiding these obstacles.

When such a self-propelling cleaning robot is activated, it cleans by traveling in a cleaning area while automatically avoiding the obstacle. However, since the self-propelling cleaning robot travels randomly if a traveling route is not specified, there is a problem that an uncleaned area is left, or the same area is cleaned many times, and therefore, cleaning efficiency is insufficient.

In order to solve the problem described above, for example, in an electric vacuum cleaner described in Patent Document 1, the electric vacuum cleaner creates a map of a cleaning area, and travels a traveling route set based on the map, to fully clean the cleaning area efficiently and completely. Moreover, in a cleaning robot described in Patent Document 2, a user specifies the traveling route based on the map of the cleaning area created by the cleaning robot, and therefore, the cleaning robot can efficiently clean along the traveling route.

REFERENCE DOCUMENTS OF CONVENTIONAL ART

Patent Documents

Patent Document 1: JP2018-075191A
Patent Document 2: JP2007-226322A

However, the traveling route, which is set automatically by the electric vacuum cleaner according to a program incorporated in advance as described in Patent Document 1, may not be an efficient traveling route demanded by a user. Moreover, even if the traveling route can be specified by the user as described in Patent Document 2, a range of selection is narrow, for example, whether to specify the route to be cleaned by lines, or to specify a point around which to be cleaned. Therefore, there is a problem that a detailed specification which satisfies a demand of the user, such as to clean entire cleaning area while cleaning a specific area preferentially by traveling back and forth, etc., is impossible.

SUMMARY

The present disclosure provides a self-propelling cleaning robot in which a detailed setting of a cleaning method desired by a user is possible.

A self-propelling cleaning robot of the present disclosure includes a main body, a driving part configured to propel the main body, a cleaning part attached to the main body and configured to clean a cleaning area, a sensor part attached to the main body and configured to detect an obstacle, and a control unit mounted on the main body and configured to control the driving part and the sensor part. The control unit includes a controller having an integrated development environment to create a programming code, and the controller is connectable with an external device.

In the self-propelling cleaning robot of the present disclosure, a control program of the driving part which propels the main body is created by being connectable with the external device to the controller of the control unit mounted on the main body. In this manner, by the user creating the control program of the driving part, the self-propelling cleaning robot can travel as the user desires.

The self-propelling cleaning robot according to a preferred embodiment may further include a text for programming to perform programming by the controller.

According to this configuration, even if the user does not have an experience of programming, he/she can easily perform the programming while reading the text. Therefore, the self-propelling cleaning robot of the present disclosure is also beneficial as a teaching material for an introduction to the programming.

In the self-propelling cleaning robot according to a preferred embodiment, the integrated development environment may be an environment in which a visual programming language is operatable.

According to this configuration, even a beginner in the programming, and a child or a student of young age (e.g., a student at elementary school or junior high school) can easily perform the programming Therefore, the self-propelling cleaning robot of the present disclosure is also beneficial as a teaching material for an introduction to the programming.

In the self-propelling cleaning robot according to a preferred embodiment, the sensor part may include a range finding sensor, and the controller may determine a traveling route while creating an environmental map and estimating a self-position.

According to this configuration, the self-propelling cleaning robot can automatically determine the traveling route, and therefore, the user can use the self-propelling cleaning robot without programming the traveling route.

In the self-propelling cleaning robot according to a preferred embodiment, the control unit may further include a memory configured to store programs that cause the driving part, the sensor part and the cleaning part to operate. The memory may store, in advance, a program configured to control a cleaning method.

According to this configuration, the user can use the self-propelling cleaning robot by using the program stored in the controller, without any development.

According to the self-propelling cleaning robot of the present disclosure, the detailed setting of the cleaning method desired by the user is possible.

MODE FOR CARRYING OUT THE DISCLOSURE

Below, one embodiment of the present disclosure is described with reference to the accompanying drawings.

Figure 1:
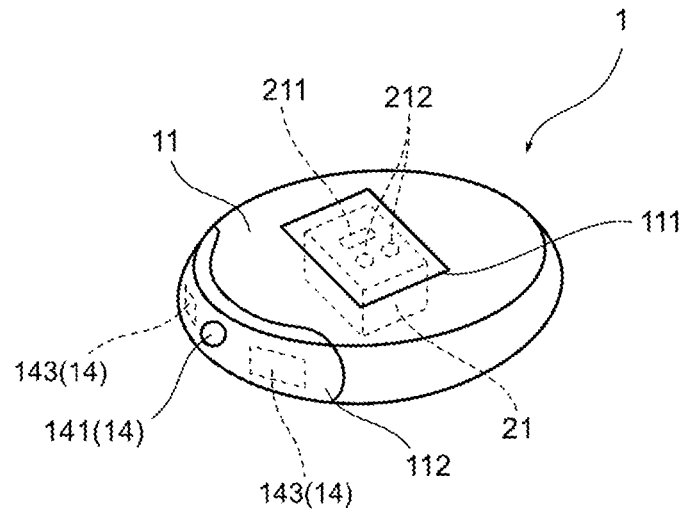
FIG. 1 is a perspective view illustrating a self-propelling cleaning robot according to one embodiment of the present disclosure.
Figure 2:
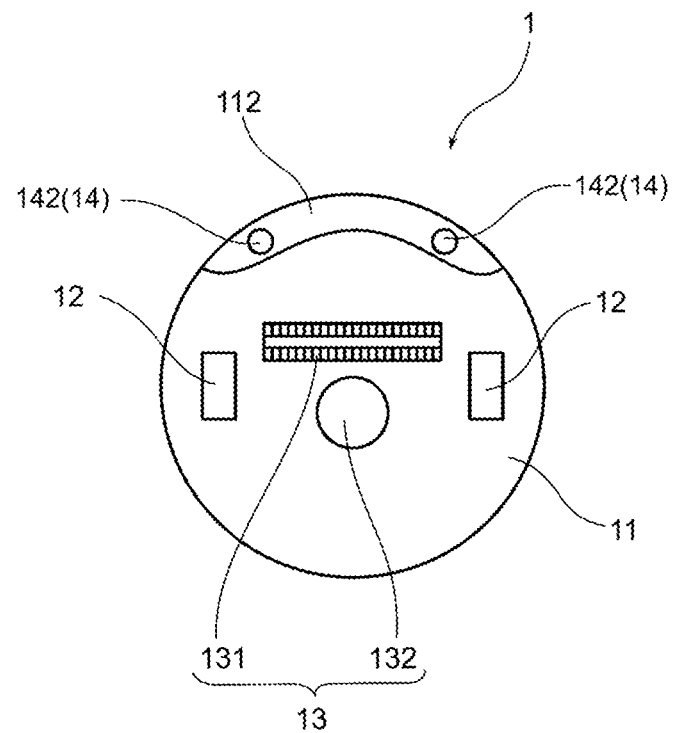
FIG. 2 is a bottom view of the self-propelling cleaning robot of FIG. 1.

As illustrated in FIGS. 1 and 2, a self-propelling cleaning robot 1 includes a main body 11, driving parts 12 which propel the main body 11, and a cleaning part 13 and sensor parts 14 attached to the main body 11.

The driving parts 12 cause the self-propelling cleaning robot 1 (the main body 11) to autonomously travel forward and rearward on a floor surface. In this embodiment, the driving parts 12 are a wheel type, and provided to left and right parts of the bottom surface of the main body 11, respectively.

The cleaning part 13 cleans a cleaning area 40 (see FIG. 5) of the floor surface. In this embodiment, the cleaning part 13 is comprised of a brush part 131 which gathers trash etc., and a suction part 132 which sucks up the gathered trash etc. The brush part 131 and the suction part 132 are provided to a center part of the bottom surface of the main body 11.

The sensor part 14 acquires information on surrounding environment by detecting an obstacle, a contact object (an object which contacts the self-propelling cleaning robot 1, such as a human, an object) etc. As the sensor part 14, an arbitrary number of, and an arbitrary combination of an obstacle sensor (e.g., a 3D depth image sensor), a contact object sensor, a range finding sensor (e.g., an ultrasonic range finding sensor, an infrared range finding sensor, a laser range finding sensor, and the 3D depth image sensor), a direction sensor (e.g., a geomagnetic sensor), a rotation angle sensor (e.g., an encoder), etc. may be used. In this embodiment, as the sensor part 14, range finding sensors 141 and 142 which detect a distance to the obstacle for the self-propelling cleaning robot 1 to travel while avoiding the obstacle, and a contact object sensor 143 which detects the contact object, are provided.

As the contact object sensor 143, an arbitrary known contact sensor which detects the contact with the object is used. The contact object sensor 143 is embedded into a bumper 112 attached to a side surface of the main body 11 at a front side. As the range finding sensors 141 and 142, a ToF laser range finding sensor 141 attached to the front side of the main body 11 (the bumper 112), and the infrared range finding sensor or the ultrasonic sensor 142 attached to the bottom surface of the main body 11 at the front side are used. Note that, other arbitrary known sensors may be used as the range finding sensors 141 and 142, as long as the distance to the obstacle is detectable.

Figure 3:
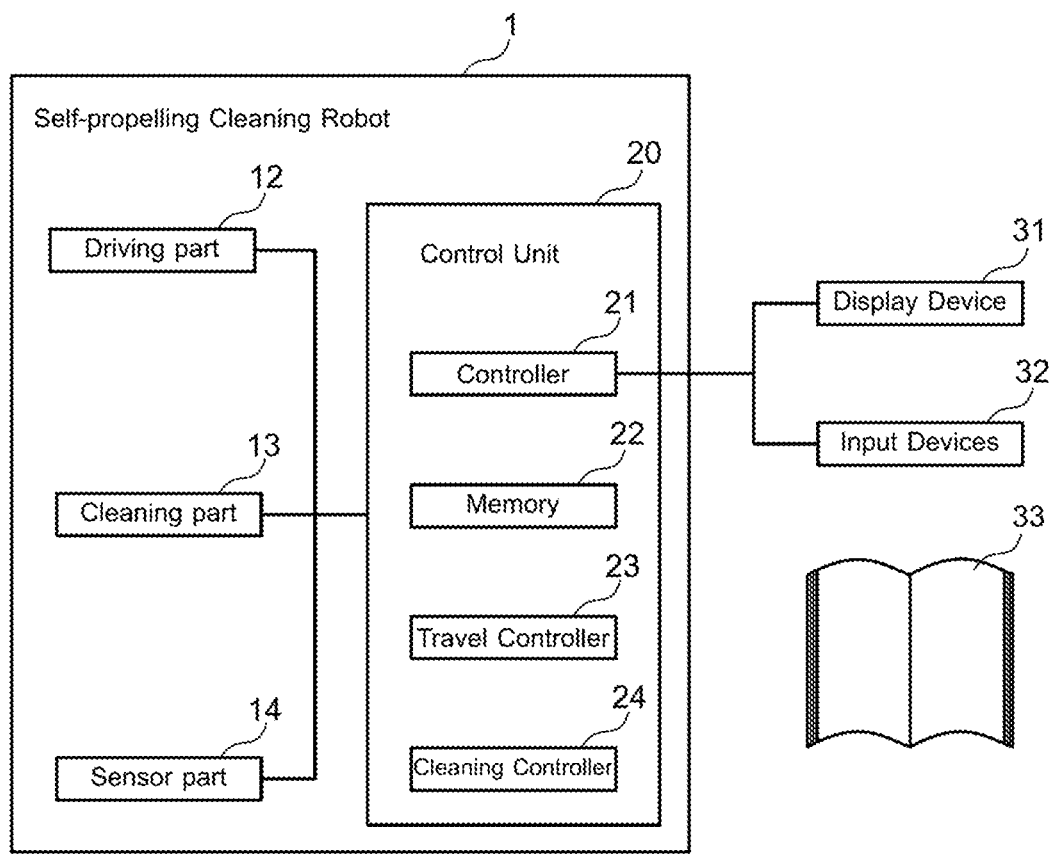
FIG. 3 is a block diagram illustrating one example of a functional configuration of the self-propelling cleaning robot of FIG. 1.

Further, a control unit 20 which controls the driving part 12, the cleaning part 13, and the sensor part 14 is mounted inside the main body 11 of the self-propelling cleaning robot 1. As illustrated in FIG. 3, the control unit 20 includes a controller 21, a memory 22, a travel controller 23, and a cleaning controller 24.

The controller 21 is, for example, a CPU (Central Processing Unit), and has an integrated development environment (IDE) for creating a programming code. Further, the controller 21 is provided with a function of controlling the sensor part 14 to acquire the information on the surrounding environment, and a function to create an environmental map of the cleaning area 40 (see FIG. 5), based on the information on the surrounding environment acquired by the sensor part 14.

Figure 4:
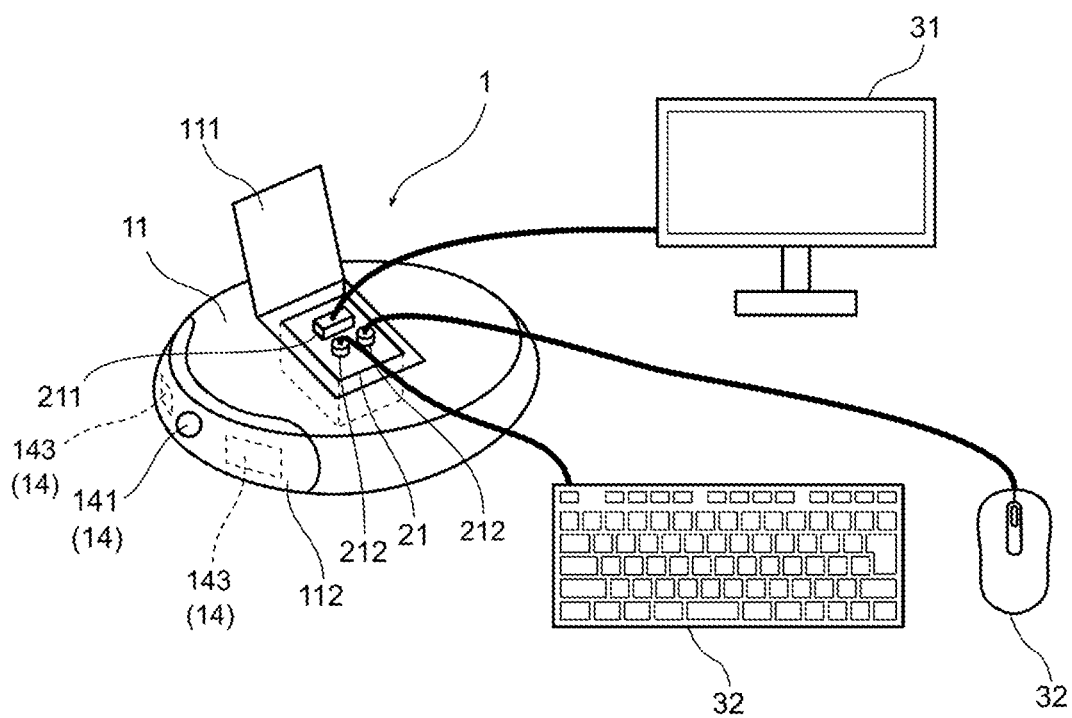
FIG. 4 is a view illustrating a state where a display device and input devices are connected to the self-propelling cleaning robot of FIG. 1.

As illustrated in FIGS. 1 and 4, the controller 21 is provided with a display device connecting port 211 and input device connecting ports 212 to connect external devices. The main body 11 is provided with a lid 111, and the display device connecting port 211 and the input device connecting ports 212 appear by opening the lid 111 of the main body 11. A display device 31 is connectable to the display device connecting port 211, and input devices 32 are connectable to the input device connecting ports 212. Note that, although two input device connecting ports 212 are illustrated in FIGS. 1 and 4, the number of the input device connecting ports 212 and the number of the input devices 32 connected to the input device connecting ports 212 is not limited to two, but it may be one, or three or more.

The display device 31 displays contents of a program to be created so that a user can confirm it, and for example, a display unit, a television screen device, etc., may be used. Further, the input device 32 is used to input the program to be created, and for example, a keyboard, a mouse, etc., may be used.

The IDE is an environment in which the user performs programming to cause the self-propelling cleaning robot 1 to perform an arbitrary operation, and is an environment in which at least one of programming languages of, for example, Python®, Java®, Scratch®, Google Blockly, Viscuit, etc., is operatable. Among them, especially, a visual programming language, such as Scratch, Google Blockly, Viscuit, etc., is preferred to be operatable.

The memory 22 stores programs that cause the driving parts 12, the cleaning part 13, and the sensor part 14 to operate. The travel controller 23 reads the program that causes the driving part 12 to operate, which is stored in the memory 22, and controls operation of the driving part 12 according to the program. The cleaning controller 24 reads the program that causes the cleaning part 13 to operate, which is stored in the memory 22, and controls operation of the cleaning part 13 according to the program.

As illustrated in FIG. 3, the self-propelling cleaning robot 1 may further include a text for programming which describes a method of the programming performed by the controller 21.

Figure 5:
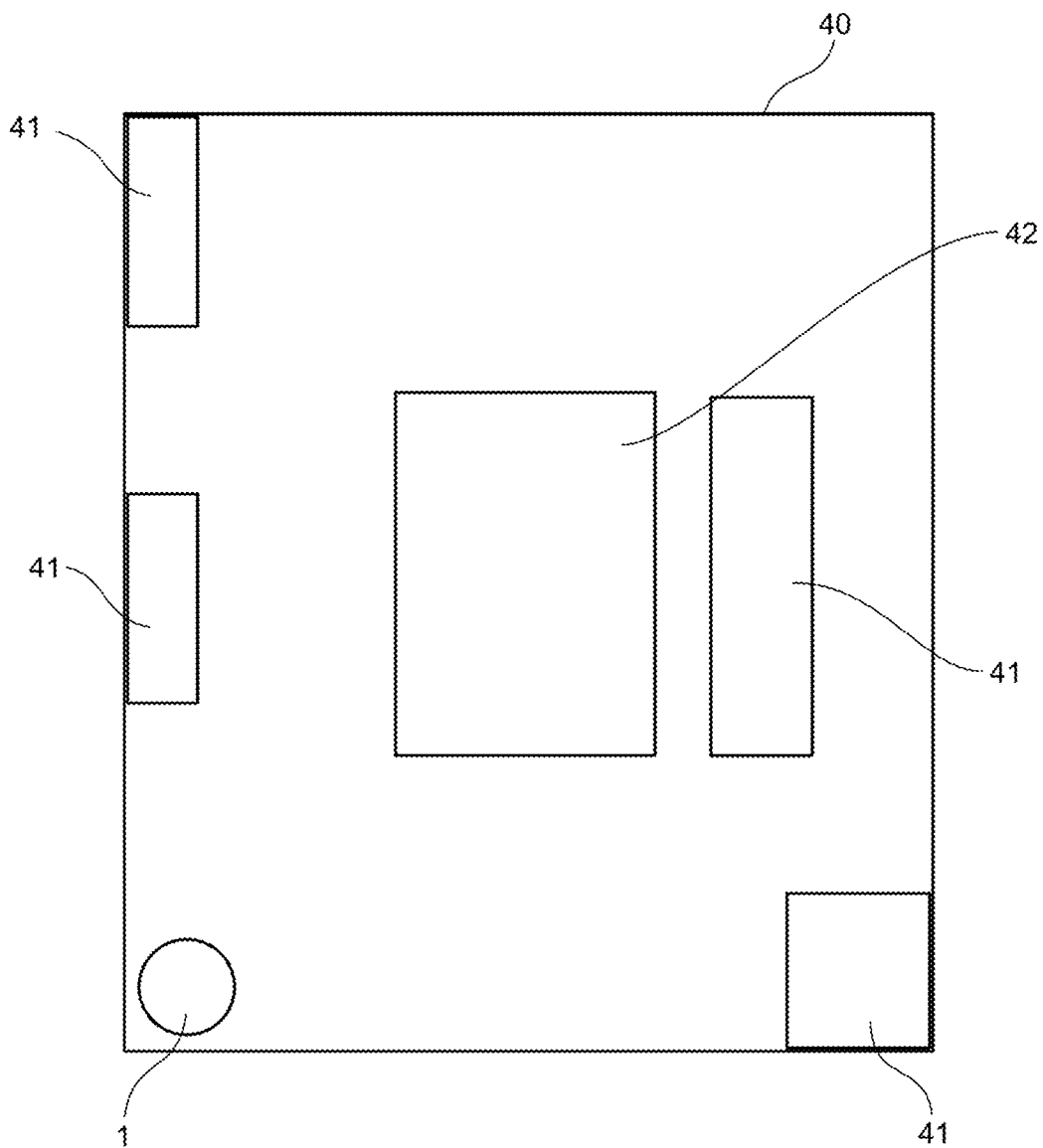
FIG. 5 is a plan view illustrating one example of a cleaning area where the self-propelling cleaning robot of FIG. 1 cleans.
Figure 6:
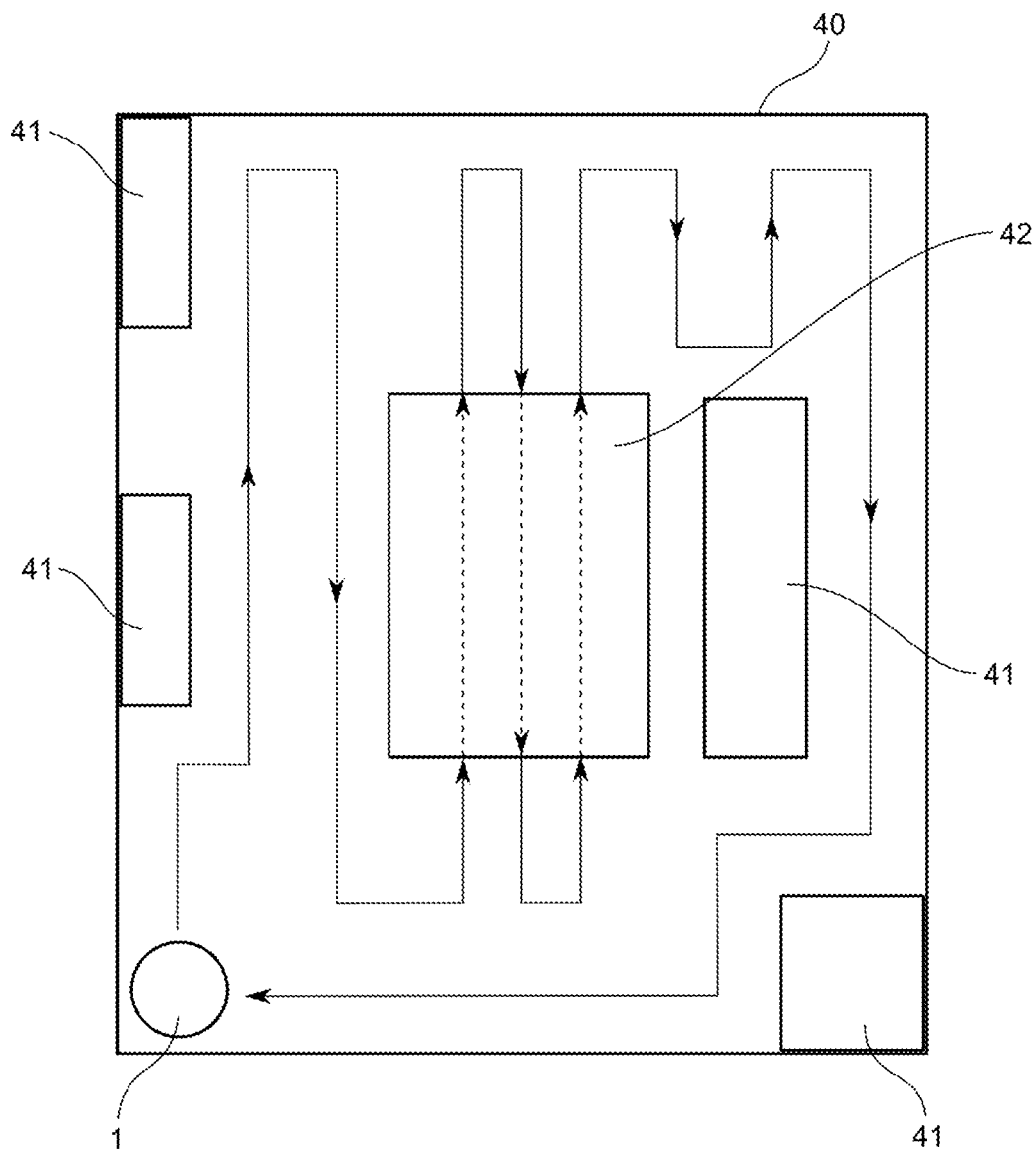
FIG. 6 is a plan view illustrating one example of a traveling route of the self-propelling cleaning robot in FIG. 1 in the cleaning area of FIG. 5.
Figure 7:
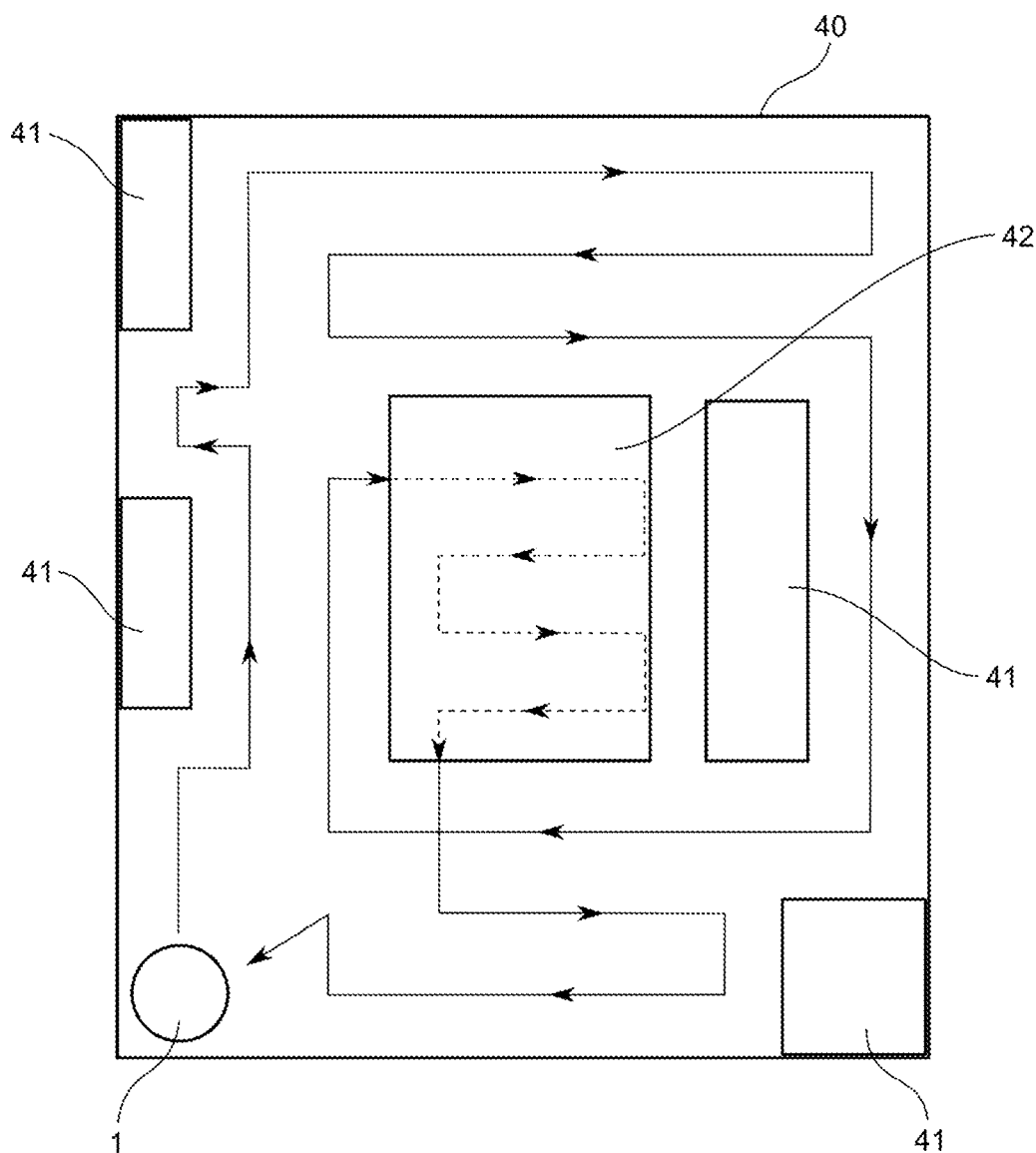
FIG. 7 is a plan view illustrating another example of the traveling route of the self-propelling cleaning robot of FIG. 1 in the cleaning area of FIG. 5.

Next, the programming of operation and a traveling route of the self-propelling cleaning robot 1 is described referring to FIGS. 5 to 7.

As illustrated in FIG. 5, within the cleaning area 40 inside a room etc., obstacles 41 and 42, such as furniture, are placed. The obstacles 41 are objects under which the self-propelling cleaning robot 1 cannot travel, such as a sofa, a shelf, and the obstacle 42 is an object under which the self-propelling cleaning robot 1 can travel, such as a table, a chair, etc.

The self-propelling cleaning robot 1 is placed inside the cleaning area 40, and when the power is turned ON, or a certain instruction is given, it starts moving inside the cleaning area 40. The self-propelling cleaning robot 1 which started moving detects a wall and the obstacles 41 and 42 inside the cleaning area 40 by the sensor part 14, and transmits the information to the controller 21. The controller 21 creates an environmental map inside the cleaning area 40 by using, for example, SLAM (environmental map creation) method etc., based on the information on the wall and the obstacles 41 and 42 inside the cleaning area 40 acquired by the sensor part 14. The created environmental map is transmitted from the controller 21 to the memory 22, and stored in the memory 22.

When the creation of the environmental map inside the cleaning area 40 is finished by the self-propelling cleaning robot 1, the user opens the lid 111 of the self-propelling cleaning robot 1 to connect the display device 31 to the display device connecting port 211, and the input devices 32 to the input device connecting ports 212. Then, a programming software is started in the IDE of the controller 21 to read the environmental map inside the cleaning area 40 stored in the memory 22 and display it on the display device 31.

The user programs a route suitable for the traveling route of the self-propelling cleaning robot 1 using the display device 31 and the input devices 32, while looking at the environmental map inside the cleaning area 40. For example, when under the obstacle 42 with legs is desired to be cleaned, a traveling route as illustrated by arrows in FIG. 6 can be considered. Further, when a small area between the obstacles 41, and every area inside the cleaning area 40 are desired to be cleaned, a traveling route illustrated by arrows in FIG. 7 can be considered. The user performs the programming so that the self-propelling cleaning robot 1 travels along such a traveling route.

The program to determine the traveling route created by the user is stored in the memory 22. The self-propelling cleaning robot 1 transmits the traveling route read from the memory 22 to the travel controller 23, and the travel controller 23 controls the driving parts 12, and thereby, the self-propelling cleaning robot 1 travels along the traveling route.

Further, the user can program an area where the user wants to preferentially clean, etc., inside the cleaning area 40, by using the display device 31 and the input devices 32. For example, when the user wants to preferentially clean the periphery of the table (the obstacle) 42, a cleaning condition, such as to boost the suction part 132 of the cleaning part 13 when traveling around the table 42, can be programmed.

The program of the cleaning condition created by the user is stored in the memory 22. The self-propelling cleaning robot 1 transmits the cleaning condition read from the memory 22 to the cleaning controller 24, and the cleaning controller 24 controls the cleaning part 13, and thereby, the self-propelling cleaning robot 1 cleans according to the cleaning condition.

As described above, according to the self-propelling cleaning robot 1 of the present disclosure, the controller 21 of the control unit 20 mounted on the main body 11 is connectable with the external devices. Since the controller 21 is provided with the IDE, the user can use the display device 31 and the input devices 32, which are the external devices connected to the self-propelling cleaning robot 1, to perform the programming to determine the operation of the self-propelling cleaning robot 1. Therefore, the traveling route and the cleaning method of the self-propelling cleaning robot 1 can be determined according to the demand of the user. As a result, the traveling route and the cleaning method focusing on the area inside the cleaning area 40, where the user wants to preferentially clean, can be determined.

Further, the self-propelling cleaning robot 1 of the present disclosure is provided with the text for the programming which describes the method of the programming performed by the controller 21. Therefore, even if the user does not have an experience of programming, he/she can easily perform the programming while reading the text. Moreover, if the IDE is the environment where the visual programming language is operatable, even a beginner in the programming, and a child or a student of young age (e.g., a student at elementary school or junior high school) can easily perform the programming Although programming education tends to become mandatory in recent years, the essence of the programming is to reduce workload of human by making the robot etc. to perform the work done by human, through the programming. According to the self-propelling cleaning robot 1 of the present disclosure, by the programming, the self-propelling cleaning robot 1 can be operated to perform cleaning, which is the work done by human, so that it preferentially cleans the area where the human may preferentially clean etc. As described above, according to the self-propelling cleaning robot 1 of the present disclosure, it is possible not only to simply learn the programming, but also to learn the programming with the essential purpose thereof. As a result, the self-propelling cleaning robot 1 of the present disclosure is also beneficial as a teaching material for an introduction to the programming.

Although one embodiment of the present disclosure is described above, the present disclosure is not limited to this configuration, and various changes are possible without departing from the spirit of the present disclosure.

For example, the driving parts 12 may be three or more wheels, or they may be a caterpillar type instead of the wheel type, as long as the driving parts 12 can cause the main body 11 to travel autonomously.

Further, the cleaning part 13 may not include the brush part 131 and the suction part 132 in a set, but may include one of them. Moreover, instead of the brush part 131 and the suction part 132, other cleaning tools, such as a floor wiping part, etc., which can wipe the floor surface, may be provided. The cleaning tools constituting the cleaning part 13 (the brush part, the suction part, the floor wiping part, etc.) may be arbitrarily combined, and the number of the cleaning tools may also be arbitrary. For example, the number of respective tools may be more than one.

Further, the self-propelling cleaning robot 1 may have an arbitrary configuration of a known self-propelling cleaning robot, as long as it is accessible from the external devices, and the control program may be created and/or may be rewritten.

Although the self-propelling cleaning robot 1 is provided with the text for the programming, it may not be a paper text, but may be an electronic text stored in the memory of the self-propelling cleaning robot 1. Further, the text for the programming is not necessary, and may not be provided.

Further, in the embodiment described above, although the self-propelling cleaning robot 1 is provided with the function to create the environmental map inside the cleaning area 40, it is not necessary to have the function to create the environmental map inside the cleaning area 40. That is, the environmental map inside the cleaning area 40 may be created by the user creating a program to create the environmental map inside the cleaning area 40, and executing the program. In this case, it is possible, for example, to create the environmental map except for the area where the cleaning is unnecessary within the same room, and the self-propelling cleaning robot 1 can clean according to the demand of the user. Moreover, the user can also learn the method of creating the environmental map of the cleaning area 40, which increases a utility value of the self-propelling cleaning robot 1 as a learning material.

On the contrary, the self-propelling cleaning robot 1 may create the environmental map, and estimate a self-position by the controller 21, to automatically determine the traveling route of the self-propelling cleaning robot 1. According to this, the self-propelling cleaning robot 1 can be used without the user programming the traveling route, and therefore, even the user who is not good at programming can easily use it.

Further, the self-propelling cleaning robot 1 may record a program that controls the traveling route and/or the cleaning method in advance on the controller 21. According to this, the user can use the self-propelling cleaning robot 1 by using the program stored in the controller 21, without any development. Moreover, the program recorded in advance may be changeable by accessing the controller 21 from the external devices. According to this, only a part of the program where the user wants to change can be corrected from the program recorded in advance, and the self-propelling cleaning robot 1 can be operated by programming the part, and therefore, labor for the user to program can be reduced.

DESCRIPTION OF REFERENCE CHARACTERS

1 Self-propelling Cleaning Robot
11 Main Body
12 Driving Part
13 Cleaning Part
14 Sensor Part
141 Laser Range Finding Sensor
142 Infrared Range Finding Sensor, Ultrasonic Range Finding Sensor
20 Control Unit
21 Controller
22 Memory
33 Text for Programming
40 Cleaning Area

What is claimed is:

1. A self-propelling cleaning robot, comprising:
a main body;
a driving part configured to propel the main body;
a cleaning part attached to the main body and configured to dean a cleaning area;
a sensor part attached to the main body and configured to detect an obstacle; and
a control unit mounted on the main body and configured to control the driving part and the cleaning part,
wherein the control unit includes a memory configured to store programs that cause the driving part and the cleaning part to operate, and a controller configured to write the programs in the memory and read the programs from the memory,
the controller includes an integrated development environment (IDE) and is connectable with a display device and input devices, which are external devices, and
a programming code of the programs is created, rewritten, and deleted by a user using the integrated development environment, the display device and the input devices, and the programming code enables an operation which is not stored in the memory by a manufacture and where the IDE programming and compiling area is separate from the manufactures pre-stored un-editable program code; where the user generated code in the IDE does not interact with said manufactures program when run by the system.

2. The self-propelling cleaning robot of claim 1, wherein the integrated development environment is an environment in which a visual programming language is operable.

3. The self-propelling cleaning robot of claim 1, further comprising a text for describing a method of programming.

4. The self-propelling cleaning robot of claim 1, wherein the sensor part includes a range finding sensor, wherein the controller determines a traveling route while creating an environmental map and estimating a self-position.

* * * * *